United States Patent [19]
Stanbury et al.

[11] Patent Number: 5,391,041
[45] Date of Patent: Feb. 21, 1995

[54] HYDRAULICALLY OPERATED BUS RAMP MECHANISM

[75] Inventors: David A. Stanbury; Glenn M. Campbell, both of Winnipeg; Philip J. Fleury, Headingly, all of Canada

[73] Assignee: New Flyer Industries Limited, Winnipeg, Canada

[21] Appl. No.: 977

[22] Filed: Jan. 6, 1993

[51] Int. Cl.$^6$ .............................................. B65G 67/00
[52] U.S. Cl. .................................... 414/537; 91/464; 414/921
[58] Field of Search .................. 414/537, 546, 921; 91/461, 464, 465

[56] References Cited

U.S. PATENT DOCUMENTS

| | | | |
|---|---|---|---|
| 4,026,387 | 5/1977 | Abreu . | |
| 4,039,085 | 8/1977 | Livengood | 91/464 X |
| 4,113,121 | 9/1978 | Collins et al. . | |
| 4,274,172 | 6/1981 | Franklin | 414/537 X |
| 4,339,224 | 7/1982 | Lamb | 414/501 |
| 4,372,727 | 2/1983 | Fredrickson et al. | 414/537 |
| 4,392,771 | 7/1983 | Smalley | 414/545 |
| 4,422,474 | 12/1983 | Basrai et al. | 91/464 X |
| 4,450,753 | 5/1984 | Basrai et al. | 91/464 X |
| 4,523,513 | 6/1985 | Gudat et al. | 91/465 X |
| 4,555,974 | 12/1985 | Mason et al. | 91/464 X |
| 4,556,128 | 12/1985 | Thorley et al. | 414/921 X |
| 4,753,269 | 6/1988 | Klein | 91/464 X |
| 4,759,682 | 7/1988 | Hood | 414/537 |
| 4,966,516 | 10/1990 | Vartaniam | 414/537 |

Primary Examiner—Michael S. Huppert
Assistant Examiner—James Eller
Attorney, Agent, or Firm—Rogers, Howell & Haferkamp

[57] ABSTRACT

A mechanism is provided for deploying a wheelchair ramp at the door of a vehicle, especially a bus, the ramp being of the kind which rotates between a stowed position at which it is flush with the vehicle floor and a deployed position in which it slopes downwardly and outwardly from the vehicle. The mechanism provides a "float down" feature which permits the ramp to move downward under gravity without the need for operator control and prevents crushing of obstacles that get in the downward path of the ramp. The mechanism includes a transmission for translating a single hydraulic cylinder stroke into more than 180° of rotation of the ramp.

8 Claims, 3 Drawing Sheets

HYDRAULICALLY OPERATED BUS RAMP MECHANISM

BACKGROUND OF THE INVENTION

1. Field of the Invention

The present invention relates to a mechanism for operating a ramp member in an access opening in a vehicle. It is particularly designed for deploying and stowing a wheelchair ramp at the entranceway of a bus by rotation around an axis close to the side of the bus.

2. Prior Art

Various ramp operating systems for buses and other vehicles are known in the art. Some have a complex link arrangement allowing them to lift a chair while remaining horizontal. Some slide out from underneath the floor of the bus and tilt down. Others are stowed in a vertical position and are pivoted about a horizontal hinge. The present invention is concerned with a "flip-out" type of ramp which is normally stowed in a horizontal position in a recess in the bus floor, and is pivoted upward and outwards to a downward sloping extended position, after the bus door has been opened. Such a ramp needs an operating mechanism by which it can be rotated through more than 180°.

Prior art operating systems for use with such flip-out ramps use a gear drive or hydraulic cylinder mechanism to pivot the ramp outward. However, with such prior art systems, the ramp cannot be moved manually in the event of a failure of the power source unless the drive mechanism is first disengaged. The need to disengage the drive mechanism in the event of a failure of the power source and to re-engage the mechanism afterwards, is a serious disadvantage to such systems. Further, such prior art hydraulic cylinder drive mechanisms do not give the range of movement to permit the ramp to be pivoted under hydraulic control through more than 180°. In addition, such prior art systems require complex safety arrangements to prevent the ramp from moving with such force as to crush obstacles that get in the downward path of the ramp.

SUMMARY OF THE INVENTION

The present invention comprises a simple and inexpensive hydraulic cylinder mechanism, which provides a "float down" feature which permits the ramp to move downward under gravity without the need for operator control and prevents accidental crushing of obstacles that get in the downward path of the ramp.. In the event of a power source failure, the ramp can be operated manually without disengaging the drive mechanism. Manual operation requires only that the ramp be lifted to just past the vertical position from which it will "float down" to the final position with the hydraulic system acting as a damper. The invention simply achieves the necessary movement of more than 180° from stowed to deployed position.

According to the present invention, there is provided a hydraulically operated mechanism for rotating a vehicle access ramp member about a horizontal axis between a stowed, generally horizontal position within the vehicle and a deployed, generally outwardly and downwardly sloping position permitting passenger access to the vehicle comprising:
- a source of hydraulic fluid pressure having a high pressure feed line and a low pressure return line;
- a valve means connected to said feed and return lines;
- a double acting hydraulic cylinder connected to said valve means and responsive to a pressure differential at its piston and rod ends for effecting linear movement;
- a transmission means connected to said hydraulic cylinder and to said ramp member for translating said linear movement into more than 180° of rotational movement of said ramp member about said axis;
- said valve means having first and second positions for selectively connecting said feed and return lines to said piston and rod ends or said rod and piston ends respectively, for effecting reversible movement of said hydraulic cylinder and having a third position for hydraulically connecting said rod end to said piston end, thereby permitting said ramp member to be rotated manually through its entire range of movement without disconnecting said transmission means.

Preferably, the invention includes a flow restrictor such as an orifice in the hydraulic connection between the piston and rod ends of the hydraulic cylinder to damp the movement of the ramp member in the "float down" mode or when under manual control.

Preferably, the invention includes a transmission means effective to translate the linear movement of the hydraulic cylinder into greater than 180° of rotation without stroke reversal of the hydraulic cylinder and without causing the line of action of the hydraulic cylinder to become aligned with the axis of rotation of the ramp. In a preferred embodiment, the transmission means is a cam driven by a cam driver actuated by the hydraulic cylinder, the cam having a slot of involute curvature.

BRIEF DESCRIPTION OF THE DRAWINGS

The invention will be described in more detail with reference to the accompanying drawings which show a preferred embodiment, and in which.

DESCRIPTION OF THE PREFERRED EMBODIMENT

Figure 1:
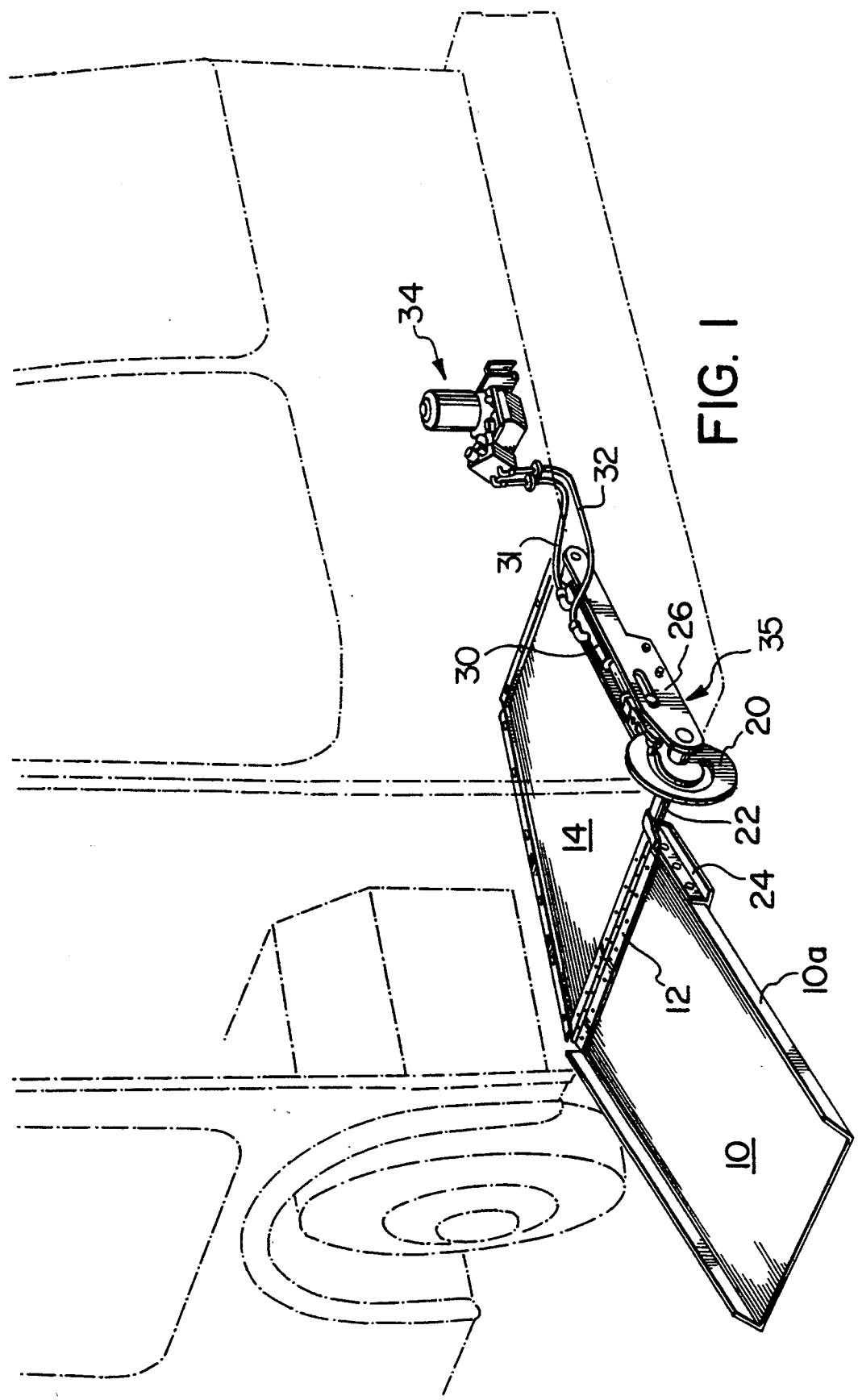
FIG. 1 is a perspective view of the front end of a bus having a ramp member and operating mechanism in accordance with the invention, the bus chassis being shown in broken lines.

FIG. 1 shows how the mechanism of this invention is applied to a flip-out wheelchair ramp used at the front doorway of a bus.

As shown, a metal ramp member 10 is connected to hinge 12 which extends along the outer side of the floor of the bus, at the door opening, the hinge providing a horizontal axis for movement of the ramp between the extended position shown, where it slopes down from the bus floor to a sidewalk, and a stowed position within recess 14, flush with the bus floor. This movement involves rotation of the ramp about the hinge of more than 180°.

The ramp member 10 is rotated between stowed and extended positions by a hydraulic drive mechanism comprising motor/pump/valve unit 34 and hydraulic cylinder 30. Hydraulic cylinder 30 is double acting and is connected to motor/pump/valve unit 34 by hydraulic lines 31 and 32.

Hydraulic cylinder 30 is capable of effecting linear movement. In order to translate said linear movement into rotational movement of ramp member 10, hydraulic cylinder 30 is connected to a transmission means, generally indicated by numeral 35. Transmission means 35 connected to ramp member 10 through shaft 22 coaxial with the hinge axis. Shaft 22 is connected to ramp member 10 by means of arm 24 fastened to flange 10a of ramp member 10. Transmission drive means 35 is capable of translating the forward linear movement of hydraulic cylinder 30 into rotational movement of ramp member 10 through greater than 180°.

The "float down" feature of the present invention permits the operator to lift the ramp member under hydraulic power to just past the vertical position. Thereafter, the operator can turn off power to hydraulic motor/pump/valve unit 34 and permit ramp member 10 to "float down" either to the stowed or extended position without further operator assistance. This frees the operator to assist the passenger to his or her seat or to attend to other duties away from the hydraulic controls without having to wait until the ramp is fully stowed or deployed.

Figure 4:
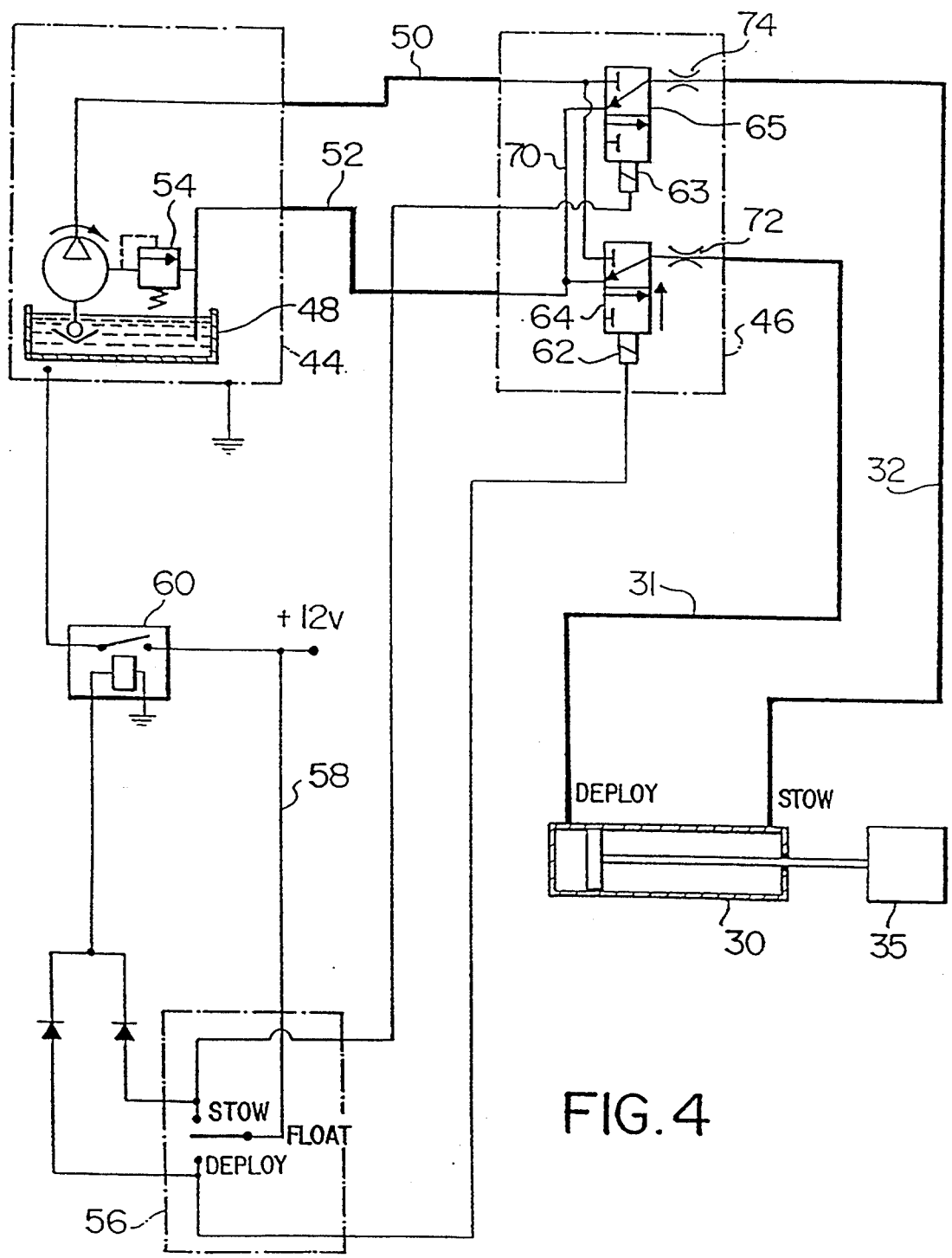
FIG. 4 is a schematic diagram of the hydraulic drive system.

In order to achieve the "float down" feature of this invention, the hydraulic drive mechanism is configured as shown in FIG. 4. Motor/pump/valve unit 34 comprises motor/pump 44 and valve manifold 46. Motor/pump 34 draws hydraulic fluid from reservoir 48 and outputs to feed line 50. Hydraulic fluid returns to reservoir 48 through return line 52. In the event of an overpressure condition in the hydraulic drive mechanism, for example, if the ramp were to become jammed while being raised, relief valve 54 bleeds pressure to return line 52.

Switch 56 is located in the vehicle in a location convenient to the operator, for example, on the vehicle dashboard. Switch 56 is a three position switch connected to the vehicle's electrical system through power line 58. Switch 56 is spring biased to the off or "FLOAT" position. Movement of switch 56 to the "STOW" or "DEPLOY" position causes relay 60 to make thereby applying electrical power to motor/pump 44, and pressurizing hydraulic feed line 50.

With switch 56 held in the "DEPLOY" position, solenoid 62 in valve manifold 46 is energized, moving valve 64 in the direction of the arrow so as to connect feed line 50 through valve manifold 46 to line 31, thereby delivering hydraulic fluid pressure to the piston side of hydraulic cylinder 30. This causes hydraulic cylinder 30 to extend driving transmission means 35 causing ramp mechanism 10 to commence upward movement from the stowed position. Low pressure hydraulic fluid from the rod side of hydraulic cylinder 30 is returned to reservoir 48 through line 32 and valve 65 in valve manifold 46.

Once ramp member 10 has been raised past vertical and is commencing downward movement toward the deployed position, the operator releases switch 56 which returns under spring pressure to the "FLOAT" position thereby cutting off power to motor/pump 44. In the "FLOAT" position, solenoids 62 and 63 are not energized and lines 31 and 32 are connected through valves 64 and 65 and manifold line 70. As ramp member 10 falls under the force of gravity, it acts through transmission means 35 to extend hydraulic cylinder 30 with hydraulic fluid circulating from the rod side of hydraulic cylinder 30, through line 32, valve manifold 46, and line 31 back to the piston side of hydraulic cylinder 30. Make-up fluid to account for the volume displaced by the rod of hydraulic cylinder 30 is drawn from reservoir 48 through return line 52. A flow restrictor in line 31, such as orifice 72 acts to throttle the hydraulic fluid and slow or damp the descent of ramp member 10, thereby providing the "float down" feature of the invention.

In the event that a passenger or other object is in the way of descending ramp member 10, there is no danger of crushing or injury as the ramp is not being hydraulically driven while descending in the "float down" mode. In addition, once ramp member 10 is fully deployed it is free to move about its hinge during shifting of the bus, thereby avoiding mechanical damage to the ramp or hinge mechanisms.

After ramp member 10 is fully deployed and the passenger has embarked or debarked, the operator holds switch 56 to the "STOW" position, energizing solenoid 63 and moving valve 65 so as to connect feed line 50 through valve manifold 46 to line 32, thereby directing hydraulic fluid pressure to the rod side of hydraulic cylinder 30. This causes hydraulic cylinder 30 to retract and ramp mechanism 10 to commence upward movement from the deployed position. Low pressure hydraulic fluid on the piston side of hydraulic cylinder 10 is returned to reservoir 48 through line 31, valve 64 in valve manifold 46 and return line 52.

Once ramp member 10 has been raised past vertical, and is commencing downward movement toward the stowed position, the operator releases switch. 56 which returns under spring pressure to the "FLOAT" position cutting power to motor/pump 44 and permitting ramp member 10 to "float down" to the stowed position. The downward motion of ramp member 10 is slowed or damped by the throttling effect of orifice 74 in line 32.

The hydraulic drive mechanism of the present invention permits ramp member 10 to be moved manually in the event of a power failure, without the need to disconnect rotational drive mechanism 35. Because valves 64 and 65 are normally biased to the "FLOAT" position, ramp member 10 can be moved manually, requiring only sufficient force to overcome its weight and the hydraulic fluid pressure drop across orifices 72 and 74. In addition, once the operator has lifted ramp member 10 just past vertical, it can be released and allowed to "float down" in a controlled manner as described above.

In order to convert linear motion into rotational motion, the force of a hydraulic cylinder must act at a distance from the axis of rotation of the driven element so as to develop a moment arm. If rotation in excess of 180° is desired, at some point of rotation of the driven element, the line of action of the hydraulic cylinder and the axis of rotation of the driven element will be aligned and no moment arm will be developed. Unless the driven element has substantial inertia, it will not pass through this point. In the case of a vehicle access ramp which must be raised slowly and under control and should be light enough to permit manual operation, inertia cannot be safely relied on to effect movement in excess of 180°. As a result, it is desirable that transmission means 35 translate linear motion of hydraulic cylinder 30 into more than 180° of rotation without causing the line of action of hydraulic cylinder 30 to be aligned with the axis of rotation of ramp member 10.

In addition, it is desirable to be able to develop more than 180° of rotation of the driven element by a single hydraulic cylinder piston stroke. If the required degree of rotation has not been achieved by the time that the hydraulic cylinder piston has reached its limit of travel, the direction of the piston must be reversed, requiring a complex arrangement to reverse pressure in the hydraulic feed and return lines. Thus, a simple connecting rod arrangement between hydraulic cylinder 30 and shaft 22 is not suitable for this purpose.

In accordance with a preferred embodiment of the invention, transmission means 35 comprises cam 20 in the form of a part circular plate fixed transversely to shaft 22 coaxial with the hinge axis; the shaft moves the ramp by means of arm 24 fastened to flange 11 of ramp member 10. Shaft 22 has a forward end journalled in two similar side plates 26 which are spaced apart to provide a housing. Transmission means 35 is mounted within the front part of the bus chassis behind the front bumper, with the cam projecting out through a slot in the side of the bus.

Figure 2:
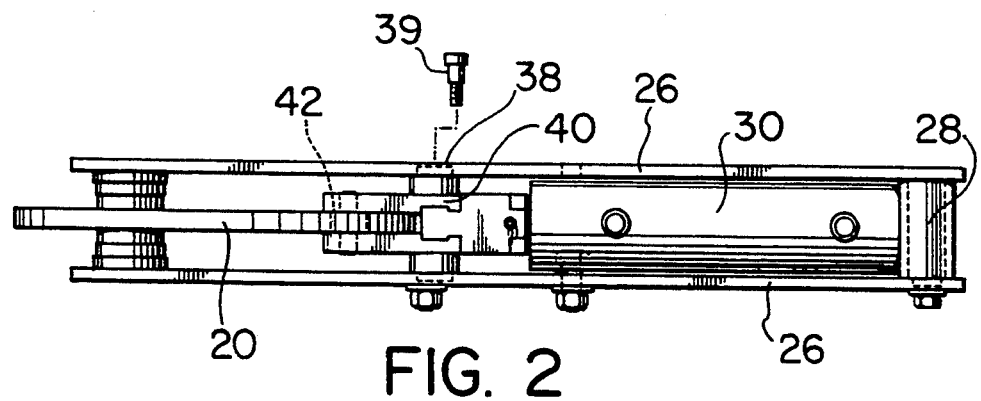
FIG. 2 is a top view of the cam transmission means and associated hydraulic cylinder.
Figure 3:
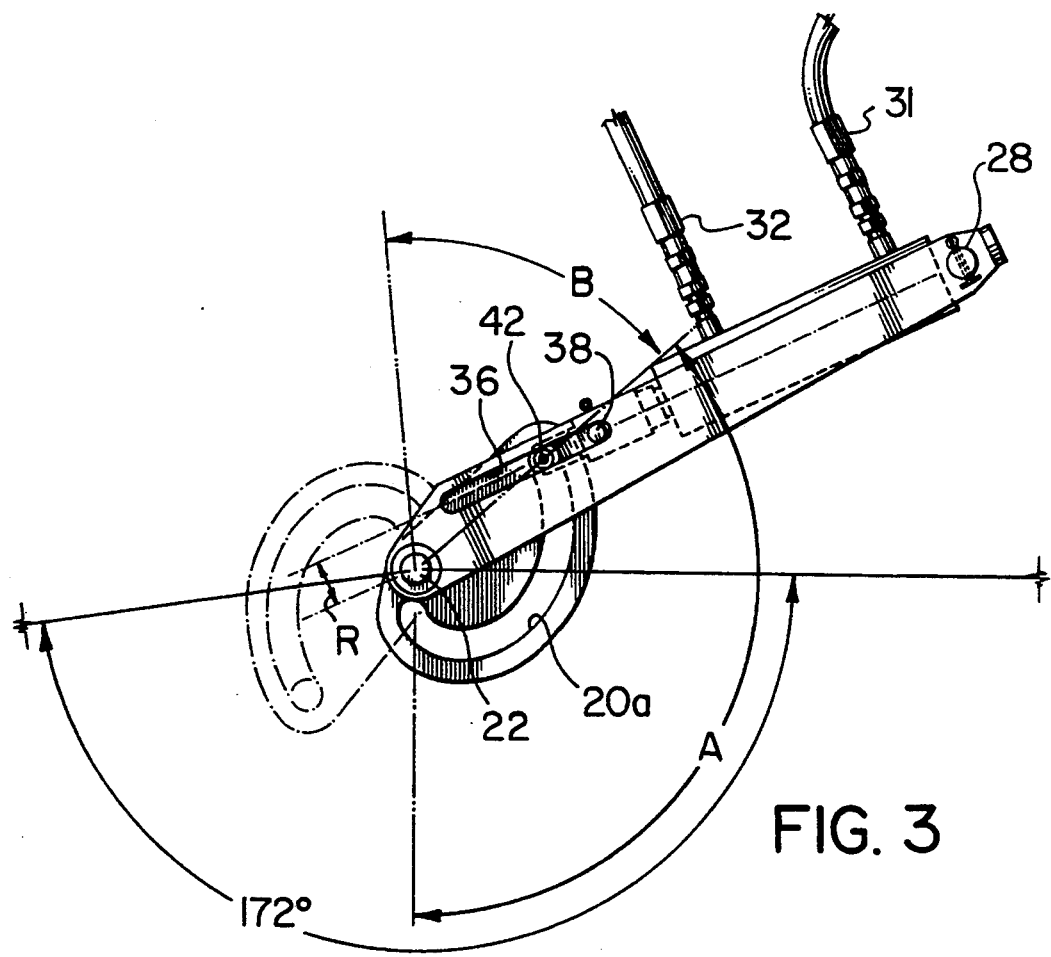
FIG. 3 is a side view of the cam transmission means and associated parts of the mechanism, showing the extreme positions of rotation.

As shown in FIGS. 2 and 3, each side plate has, at its rear end, a mounting 28 for the rear end of hydraulic cylinder 30. Each side plate 26 has a slot 36, and these slots provide a guideway for roller elements 38 held by bolts 39, which project from the sides of crosshead 40 attached to the rod of hydraulic cylinder 30. This crosshead also carries a roller element 42 which acts as a cam driver within a slot 20a of cam 20. As shown in FIG. 3, slots 36 constrain the cam driver to move in a straight line of action offset above the axis of shaft 22.

Slot 20a curves in an arc about shaft 22, from an outer end to an inner end which is relatively close to the axis of rotation. When hydraulic cylinder 30 is retracted, cam driver 42 is at the outer end of slot 20a, and the ramp is in the stowed position, as shown in solid lines in FIG. 4. When hydraulic cylinder 30 is extended, cam driver 42 acts on slot 20a to rotate cam 20 counter-clockwise as seen in FIG. 3, raising the ramp member up to and through the vertical. "Float down" of ramp member 10 causes further rotation of cam 20 until cam driver 42 is at the inner end of slot 20a.

As shown in FIG. 3, the rotational force on cam 20 is dependent both on the distance R between the line of action of cam driver 42 and the axis of rotation (i.e. the moment arm at which driver 42 operates cam 20) and on the shape of cam slot 20a. The preferred shape of slot 20a approximates an involute curve as shown in FIG. 3. An involute curve is the locus of points defined by the end of a string as it is unwound from a cylinder, in this case a cylinder having the radius R. With a true involute curve, the portion of the surface of cam slot 20a in contact with driver 42 will always be perpendicular to the line of action of driver 42, and the moment arm R at which cam driver 42 acts, remains constant. As a result, the line of action of cam driver 42 will not be aligned with the axis of rotation of ramp member 10 at any point of rotation.

The total amount of rotation which can be applied to cam 20 is the sum of angle A, which is the angle which the cam slot 20a subtends at the axis, and angle B, which represents the change in angular position of cam driver 42 relative to the axis of cam 20 during movement of cam driver 42 between its extreme positions. The total of angles A and B is greater than 180°. Accordingly, this mechanism achieves a rotation of more than 180° within a single stroke of hydraulic cylinder 30.

Preferably, transmission means 35 is a cam means as described above, although it can comprise any suitable means for producing the required degree of rotation of shaft 22, for example, a simple gear mechanism of suitable overall gear ratio.

We claim:

1. A hydraulically operated mechanism for rotating a vehicle access ramp member about a horizontal axis between a stowed, generally horizontal position within the vehicle and a deployed, generally outwardly and downwardly sloping position permitting passenger access to the vehicle comprising:

a source of hydraulic fluid pressure having a high pressure feed line and a low pressure return line;

valve means connected to said feed and return lines;

a double acting hydraulic cylinder having a piston end and a rod end and connected to said valve means and responsive to a pressure differential at its piston and rod ends for effecting linear movement;

transmission means connected to said hydraulic cylinder and to said ramp member for translating said linear movement into more than 180° of rotational movement of said ramp member about said axis;

said valve means having first and second positions for selectively connecting said feed and return lines to said piston and rod ends or said rod and piston ends respectively, for effecting reversible movement of said hydraulic cylinder and having a third position for hydraulically connecting said rod end to said piston end, thereby permitting said ramp member to be rotated manually through its entire range of movement without disconnecting said transmission means.

2. The hydraulically operated mechanism of claim 1 including means for damping the movement of said ramp member under manual rotation.

3. The hydraulically operated mechanism of claim 2 wherein the means for damping is a flow restrictor in said hydraulic connection between said rod and piston ends.

4. The hydraulically operated mechanism of claim 3 wherein said flow restrictor is an orifice.

5. The hydraulically operated mechanism of claim 1 wherein said valve means is normally biased to said third position.

6. The hydraulically operated mechanism of claim 1 wherein said transmission means is effective to translate the linear movement of said hydraulic cylinder into greater than 180° of rotation without stroke reversal of said hydraulic cylinder and without causing the line of action of said hydraulic cylinder to be aligned with said axis.

7. The hydraulically operated mechanism of claim I wherein said transmission means comprises a cam plate rotatable with said ramp member about its axis and perpendicular thereto, said plate having a curved slot extending about said axis and having a first end and a second end, the first end being further from the axis than the second end, a cam driver actuated by said hydraulic cylinder and constrained to move along a line of action off-set from said axis, said cam driver engaged in said cam slot at said first end when said ramp member is in the stowed position and at said second end when said ramp member is in said deployed position and effective to cause rotation of said cam plate about said axis as it moves along said line of action.

8. The hydraulically operated mechanism of claim 7 wherein said slot has an involute curvature and the sum of the angle subtended by said slot at said axis and the angle subtended by the change in position of said cam driver at said axis during movement of the cam driver between its extreme positions is greater than 180°.

* * * * *